United States Patent Office 2,924,198
Patented Feb. 9, 1960

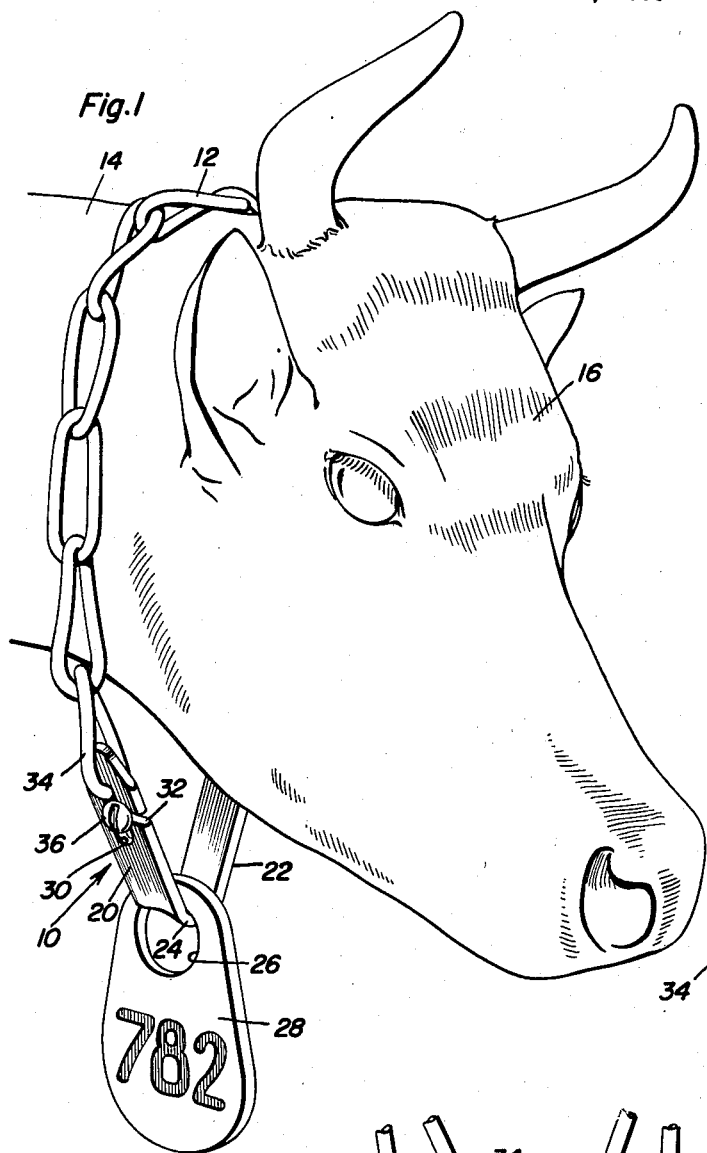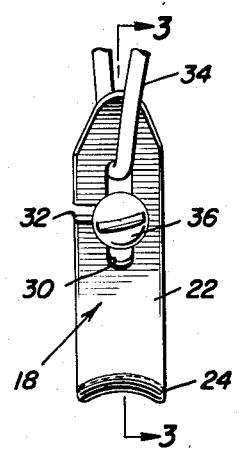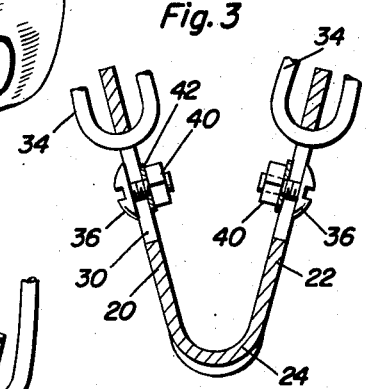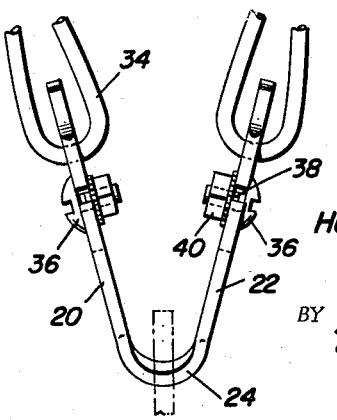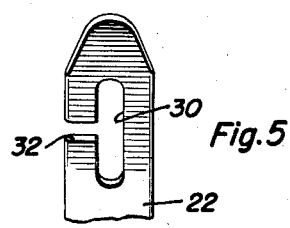
Herman J. McMurray
INVENTOR.

2,924,198

CHAIN-TAG FASTENER

Herman J. McMurray, Santa Barbara, Calif.

Application March 4, 1958, Serial No. 719,131

6 Claims. (Cl. 119—106)

The present invention generally relates to a fastening device and more particularly to a device for connection of the ends of a chain together with a support fastener for a tag which will be suspended from the chain.

An object of the present invention is to provide a chain-tag fastener employed for connecting the ends of a neck chain employed around the neck of an animal with the connector also serving as a rocker bearing support for an identification tag.

Another object of the present invention is to provide a fastener in accordance with the preceding which is simple in construction, easy to use and assemble, adapted for its particular purposes and its relatively inexpensive cost and manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the chain-tag fastener of the present invention employed in conjunction with a chain necklace being assembled on an animal;

Figure 2 is an enlarged side elevational view of the present invention;

Figure 3 is a detailed sectional view taken substantially upon a plane passing along section line 3—3 of Figure 2;

Figure 4 is a side elevational view of the construction of Figure 3; and

Figure 5 is a detailed view illustrating the slot arrangement in each end of the V-shaped connector and support.

Referring now specifically to the drawings, the numeral 10 generally designates the chain-tag fastener of the present invention which is incorporated with a chain necklace 12 disposed in encircling relation to the neck 14 of an animal such as a cow or steer 16.

The chain-tag fastener 10 includes a substantially V-shaped support member generally designated by the numeral 18 which includes a pair of diverging legs or straps 20 and 22 interconnected by a bight portion 24 which is substantially convex on the upper surface and concave on the lower surface with the legs 20 and 22 being flat. This curvature of the bight portion 24 acts to rigidify the V-shaped support member 18 and retains the configuration thereof. Also, the bight portion 24 forms a rocker bearing for the upper edge of an aperture 26 in an identification tag 28 which may be of any suitable construction but which is preferably of plastic with numerals or other significant indicia embedded therein or stamped thereon. The tag 28 may be of a particular color with the V-shaped support 18 providing a smooth bearing surface rounded to the contour of the inner surface of the opening 26 for providing a bearing surface therefor for providing long life to the tag 28.

Adjacent the free end of each of the legs 20 and 22 there is provided a longitudinally elongated slot 30. A transverse slot 32 extends from one side edge of the longitudinally elongated slot 30 to the outer edge of the corresponding leg. The slot 32 and slot 30 are adapted to receive the end link 34 of the chain necklace 12 therein as illustrated in Figure 2, whereby the chain link 34 will normally be disposed in the upper end of the slot 30 and by moving the chain link towards the inner or lower end of the slot 30, the chain link 34 may be moved outwardly through the transverse slot 32 for disconnecting the chain from the V-shaped support or connector 18.

A mechanism is provided for preventing movement of the chain link 34 through the slot 32 and this mechanism includes a fastener bolt 36 having a threaded shank 38 extending through the slot 30 with the headed end of the bolt being exposed to the exterior surface of the legs 20 and 22 respectively with each of the threaded shanks 38 being provided with a screw threaded nut 40 on the inner end thereof together with a lock washer 42, whereby the fastener bolts 36 are releasably disposed through the slot 30 and secured therein with the fastening bolt 40 forming a closure of the transverse slot 32 thus preventing exit of the chain link 34 when the fastening bolt 36 is in the position illustrated in Figures 1 and 2 inasmuch as the threaded shank 38 closes the transverse slot 32. By removing the fastener bolt or loosening the same and sliding the same to the bottom of the slot 30, the chain link 34 may be moved outwardly through the transverse slot 32 or moved inwardly therethrough for selectively connecting and disconnecting the necklace chain 12 to the V-shaped support or connector 18. As clearly seen in the drawings, slot 32 is quite a bit narrower than the longitudinally extending slot 30. This construction retains the bolt 36 in slot 30 for movement therein and prevents lateral movement of the bolt through slot 32 which is not as wide as the diameter of shank 38 as shown in Figure 4. Thus with the present construction, the V-shaped support for the tag 28 also forms a connector for the ends of the necklace chain 12 for retaining the same in position on the neck of the animal and the ends of the legs 20 and 22 are rounded to prevent any possible injury to the neck of the animal wearing the same.

The weight of the connector is more than ordinary key ring and causes the tag to hang straight down under the animal's neck thereby providing easy observation and preventing the tag from being disposed against the side of the neck of an animal. The relationship of the width of the slots makes it almost impossible to lose the bolts unless the nuts are completely removed and only a screwdriver, coin, knife blade or the like is necessary for removing the chain or adjusting the length thereof. The rounded edges, ends and bight prevents the device from catching on wire fence, stanchions, feed boxes or any similar obstacles.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in combination with a chain necklace having free ends, a support member adapted to detachably interconnect the free ends thereof for retaining the chain necklace in encircling relation to the neck of an animal, said support member including a substantially V- shaped member having a transversely rounded bight portion adapted to engage a circular opening in an identification tag, said support member also including a pair of diverging legs, each of said legs having an angulated slot therein communicating with the side edge thereof for detachably receiving an end link of the necklace chain, and removable means forming a closure for said slot for preventing disengagement of the chain link from the slot.

2. The combination of claim 1 wherein said means preventing disengagement of the chain link includes a removable fastening bolt insertible through the slot and forming a closure for the entrance end of the slot.

3. A combined support member and chain connector comprising a substantially V-shaped member including diverging legs extending outwardly from a central bight portion, each of said legs having a longitudinal slot therein and a transverse slot communicating with the central portion of the longitudinal slot and an outer edge of the leg for receiving an end link of a chain, said bight portion forming a support for an identification tag.

4. The combination of claim 3 wherein a removable screw threaded fastener is extended through the longitudinal slot at the point of intersection with the transverse slot thus forming a removable closure for the transverse slot for preventing exit or entry of the end chain link in relation to the longitudinal slot.

5. The combination of claim 4 wherein the bight portion of said member is convexly rounded on the upper surface thereof for conforming to the curvature of the inner surface of a circular aperture in an identification tag thus providing a rocking bearing support for the tag.

6. The combination of claim 4 wherein the transverse slot is narrower than the longitudinal slot, the diameter of the screw threaded fastener being greater than the width of the transverse slot thereby preventing lateral movement of the fastener through the transverse slot.

References Cited in the file of this patent

UNITED STATES PATENTS

| | | |
|---|---|---|
| 1,552,434 | Jepson | Sept. 8, 1925 |
| 1,609,187 | Petersen | Nov. 30, 1926 |
| 1,966,665 | Gourley | July 17, 1934 |
| 2,346,946 | Schacht | Apr. 18, 1944 |
| 2,774,213 | Gantz | Dec. 18, 1956 |
| 2,821,034 | Baker | Jan. 28, 1958 |